US008564941B2

(12) United States Patent
Watabe et al.

(10) Patent No.: US 8,564,941 B2
(45) Date of Patent: Oct. 22, 2013

(54) ELECTRONIC APPARATUS

(75) Inventors: Manabu Watabe, Nagano (JP); Kenji Saito, Nagano (JP)

(73) Assignee: Sony Corporation, Tokyo (JP)

( * ) Notice: Subject to any disclaimer, the term of this patent is extended or adjusted under 35 U.S.C. 154(b) by 343 days.

(21) Appl. No.: 12/827,088

(22) Filed: Jun. 30, 2010

(65) Prior Publication Data
US 2011/0051345 A1 Mar. 3, 2011

(30) Foreign Application Priority Data

Aug. 28, 2009 (JP) ................. 2009-197976

(51) Int. Cl.
*H05K 5/00* (2006.01)
*H05K 7/00* (2006.01)
*G06F 1/16* (2006.01)

(52) U.S. Cl.
USPC ............ 361/679.09; 361/679.08; 361/679.17; 361/679.55

(58) Field of Classification Search
USPC .............. 361/679.08, 679.09, 679.17, 679.55
See application file for complete search history.

(56) References Cited

U.S. PATENT DOCUMENTS

| 6,731,269 | B2 * | 5/2004 | Horiuchi et al. ............... 345/168 |
| 7,265,969 | B2 * | 9/2007 | Jin ........................... 361/679.09 |
| 7,542,274 | B2 * | 6/2009 | Minaguchi et al. ....... 361/679.55 |
| 2002/0085338 | A1 * | 7/2002 | Lin ............................... 361/680 |
| 2003/0011986 | A1 * | 1/2003 | Ariga ............................ 361/687 |
| 2007/0025071 | A1 * | 2/2007 | Yokote et al. ................. 361/680 |

FOREIGN PATENT DOCUMENTS

JP 2007-305041 11/2007

\* cited by examiner

*Primary Examiner* — Anthony Haughton
(74) *Attorney, Agent, or Firm* — Oblon, Spivak, McClelland, Maier & Neustadt, L.L.P.

(57) ABSTRACT

An electronic apparatus includes a keyboard unit, a first circuit board, and a first electronic component. The keyboard unit includes a plate that includes a front surface and a bottom surface facing each other and a first coupling portion protruding from the bottom surface, and a plurality of keys provided on the front surface side of the plate. The first circuit board is provided to face the bottom surface via the first coupling portion and includes a second coupling portion to be coupled with the first coupling portion and a first front surface as a surface on a side that faces the bottom surface. The first electronic component is mounted on the first front surface of the first circuit board.

6 Claims, 13 Drawing Sheets

ELECTRONIC APPARATUS

BACKGROUND OF THE INVENTION

1. Field of the Invention

The present invention relates to an electronic apparatus such as a foldaway laptop personal computer.

2. Description of the Related Art

From the past, a circuit board on which a plurality of electronic components and the like are mounted and a keyboard unit are incorporated in an exterior component of an electronic apparatus such as a personal computer. Such an electronic apparatus has a structure for protecting, when an impact or the like is applied from outside, the circuit board from that impact. For example, by attaching a metal frame inside the exterior component of the electronic apparatus and screwing the circuit board to the metal frame, an impact resistance is improved. To such a metal frame, ground terminals of the electronic components and the like mounted on the circuit board are electrically connected via a ground line (see, for example, Japanese Patent Application Laid-open No. 2007-305041 (paragraphs [0085] and [0086], FIG. 16)).

SUMMARY OF THE INVENTION

With the technique described above, however, there is a need to provide a metal frame for attaching a circuit board inside an exterior component in addition to a keyboard unit. Therefore, the metal frame and the circuit board overlap the keyboard unit, thus resulting in a problem that the electronic apparatus becomes thick.

In view of the circumstances as described above, there is a need for an electronic apparatus that has a reduced thickness and includes a keyboard unit.

According to an embodiment of the present invention, there is provided an electronic apparatus including a keyboard unit, a first circuit board, and a first electronic component.

The keyboard unit includes a plate that includes a front surface and a bottom surface facing each other and a first coupling portion protruding from the bottom surface, and a plurality of keys provided on the front surface side of the plate.

The first circuit board is provided to face the bottom surface via the first coupling portion and includes a second coupling portion to be coupled with the first coupling portion and a first front surface as a surface on a side that faces the bottom surface. The first electronic component is mounted on the first front surface of the first circuit board.

In the embodiment of the present invention, the keyboard unit includes the first coupling portion protruding from the bottom surface of the plate, and the first circuit board includes the second coupling portion. Therefore, the first coupling portion of the plate can be coupled with the second coupling portion of the first circuit board in a state where the bottom surface of the plate and the first front surface of the first circuit board face each other while being apart from each other via the first coupling portion. In other words, since the plate of the keyboard unit can be used for coupling the first circuit board, a metal frame for fixing the first circuit board as in the related art does not need to be provided in addition to the keyboard unit, with the result that the electronic apparatus can be made thin. Moreover, since the first electronic component is provided between the first front surface of the first circuit board and the bottom surface of the plate, the electronic apparatus can be made thinner than in a case where an electronic component is mounted on a surface on the other side of the first front surface of the first circuit board.

The bottom surface of the plate may include a first area corresponding to an area facing the first circuit board and a second area corresponding to an area outside the area facing the first circuit board. The plate may include a third coupling portion protruding from the bottom surface in the second area. The electronic apparatus may further include: a second circuit board that is provided to face the second area via the third coupling portion and includes a fourth coupling portion to be coupled with the third coupling portion and a second front surface as a surface on a side that faces the second area; and a second electronic component mounted on the second front surface of the second circuit board.

With this structure, the electronic apparatus including the first circuit board and the second circuit board can be made thinner than in a case where the first circuit board and the second circuit board overlap each other in a direction orthogonal to the bottom surface of the plate. Moreover, since the second electronic component mounted on the second front surface of the second circuit board is provided between the second area on the bottom surface of the plate of the keyboard unit and the second front surface, the electronic component can be made thin.

The bottom surface may include a third area that is an area outside the first area and the second area, the third area being provided in the vicinity of the first area. The plate may include a fifth coupling portion protruding from the third area. The electronic apparatus may further include a packaging device that includes a sixth coupling portion to be coupled with the fifth coupling portion and is provided in the third area.

With this structure, by coupling the sixth coupling portion of the packaging device with the fifth coupling portion in the third area, the packaging device can be coupled with the plate. At this time, the packaging device is provided in the third area. Therefore, it is possible to prevent the first circuit board and the packaging device from overlapping each other in the direction orthogonal to the bottom surface and make the electronic apparatus thinner than in a case where the packaging device is mounted on the first front surface of the first circuit board. Moreover, since the packaging device can be attached in the keyboard unit apart from an attachment task of the second circuit board with respect to the keyboard unit, workability in, for example, attaching and replacing the packaging device can be improved. The packaging device used herein is, for example, a wireless communication module.

The packaging device may include a coupling end portion in which the sixth coupling portion is provided. The coupling end portion may include a third surface facing the fifth coupling portion, a fourth surface as a surface on the other side of the third surface, and an external connection terminal that is provided on the fourth surface and is connectable with an external apparatus.

With this structure, the fifth coupling portion can be coupled with the sixth coupling portion while the third surface of the coupling end portion faces the fifth coupling portion. At this time, since the fourth surface of the coupling end portion on the other side of the third surface is exposed on a side facing an operator, the external apparatus can be easily connected to the external connection terminal provided on the fourth surface. As described above, workability in attaching and replacing the external apparatus can be improved. The external apparatus used herein is, for example, an antenna.

The plate and the first coupling portion may each be formed of metal, and the first coupling portion may be electrically connected to a ground line of the first circuit board.

With this structure, a metal plate of the keyboard unit can be used as a ground of the first electronic component.

The first electronic component may be mounted only on the first front surface out of the first front surface and a first back surface of the first circuit board.

With this structure, by mounting the electronic components only on one surface of each of the first circuit board and the second circuit board without mounting the electronic component on the first back surface of the first circuit board and a second back surface of the second circuit board, the electronic apparatus can be made thin.

According to the embodiment of the present invention, an electronic apparatus including a keyboard unit can be made thin.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, an embodiment of the present invention will be described with reference to the drawings.

(Structure of Electronic Apparatus)

Figure 1:
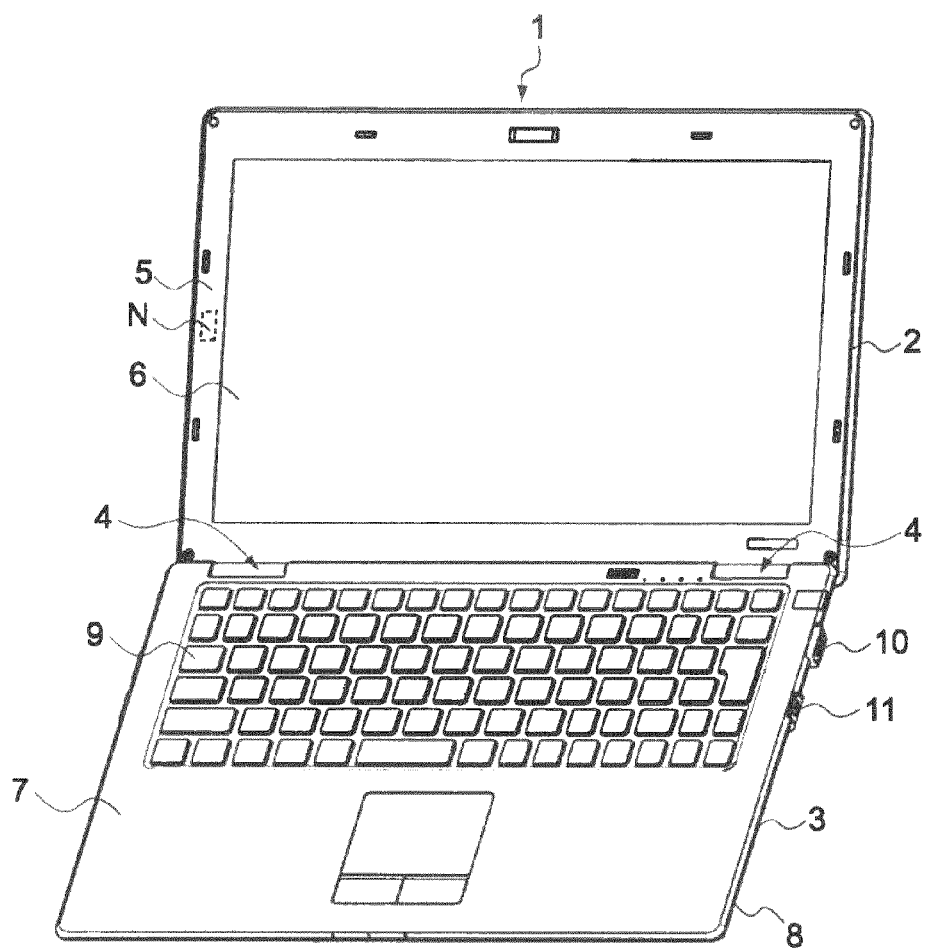
FIG. 1 is a perspective view showing a state where an electronic apparatus according to an embodiment of the present invention is opened.
Figure 2:
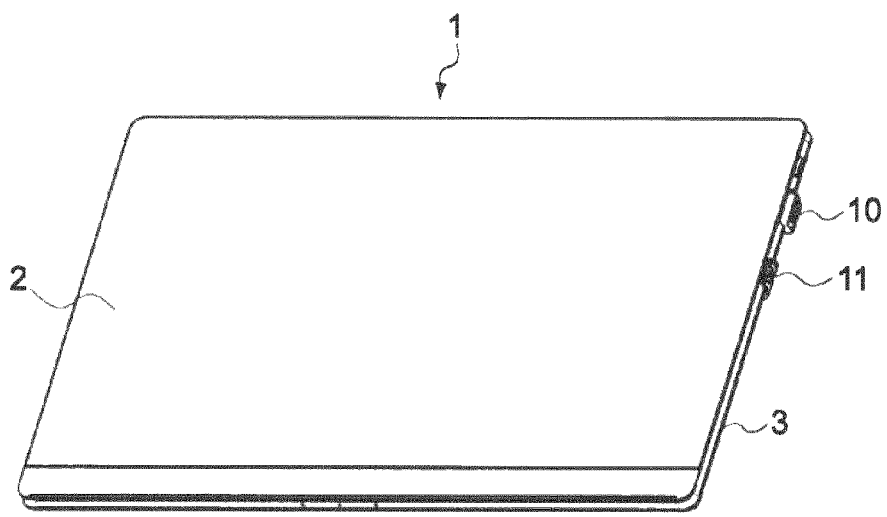
FIG. 2 is a perspective view showing a state where the electronic apparatus shown in FIG. 1 is closed.

FIG. 1 is a perspective view showing a state where an electronic apparatus 1 according to an embodiment of the present invention is opened, and FIG. 2 is a perspective view showing a state where the electronic apparatus 1 shown in FIG. 1 is closed.

The electronic apparatus 1 includes a display portion 2, a main body portion 3, and coupling portions 4 that rotatably couple the display portion 2 with the main body portion 3.

The display portion 2 can be opened and closed with respect to the main body portion 3 via the coupling portions 4. The display portion 2 includes a casing 5 of the display portion 2, a display screen 6, and an LCD (Liquid Crystal Display) display panel (not shown) that is provided inside the casing 5 for performing display processing.

The casing 5 is an exterior component of the display portion 2 that accommodates the LCD display panel (not shown). The display screen 6 is a screen for displaying information such as an image and faces the main body portion 3 in the closed state shown in FIG. 2.

The main body portion 3 includes components such as a palm rest 7 that constitutes an exterior of the main body portion 3 on an upper surface side, a bottom 8 that constitutes an exterior of the main body portion 3 on a bottom surface side, a keyboard unit 9, a VGA (Video Graphics Array) connector 10, an ether connector 11, a central processing unit (not shown), and an SSD (Solid State Drive) (not shown in FIGS. 1 and 2).

The palm rest 7 and the bottom 8 are exterior components of the main body portion 3. The palm rest 7 and the bottom 8 are each almost plate-like and constitute an exterior surface of the main body portion 3 when combined with each other. The keyboard unit 9 includes a plurality of keys, for example, and functions as an input portion of the electronic apparatus 1. A VGA connector cable is connected to the VGA connector 10. An Ethernet cable is connected to the ether connector 11. The central processing unit is mounted on a circuit board in the bottom 8. Upon receiving an input signal from the keyboard unit 9 and the like, the central processing unit carries out various types of processing such as operational processing, control processing, image processing, and output processing to the display portion 2, thus practically functioning as a functional main body of the electronic apparatus 1. The coupling portions 4 rotatably couple the display portion 2 with the main body portion 3 as will be described later. In the state shown in FIG. 1, an angle of the display screen 6 with respect to (an upper surface of) the palm rest 7 is an obtuse angle.

Figure 3:
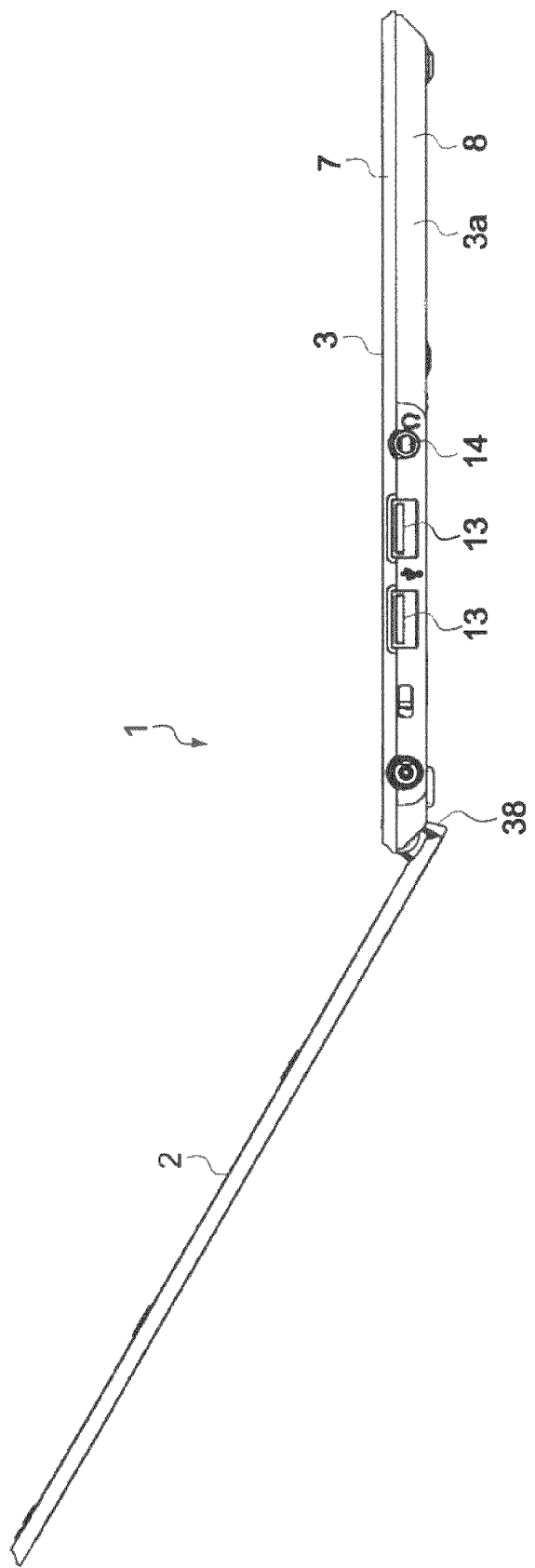
FIG. 3 is a left-side view of the electronic apparatus shown in FIG. 1.

FIG. 3 is a left-side view of the electronic apparatus 1 shown in FIG. 1.

On a left-hand side surface 3a of the main body portion 3, connectors 13 for connecting with a plurality of LAN (Local Area Network) cables, a connector 14 for connecting with a headphone cable, and the like are provided. LAN cables are connected to the connectors 13 for connecting with a LAN cable. An earphone terminal is connected to the connector 14 for connecting with a headphone cable.

Figure 4:
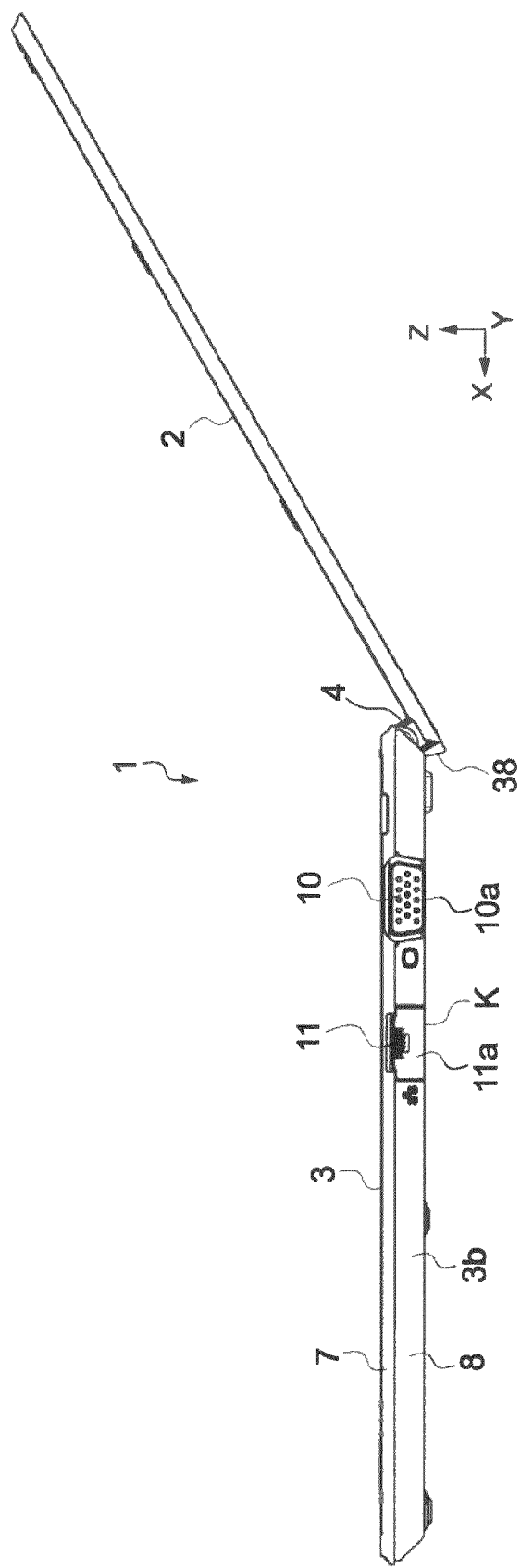
FIG. 4 is a right-side view of the electronic apparatus shown in FIG. 1.

FIG. 4 is a right-side view of the electronic apparatus 1 shown in FIG. 1.

On a right-hand side surface 3b of the main body portion 3, the VGA connector 10 and the ether connector 11 are provided. The VGA connector 10 is provided at a position closer to the coupling portion 4 than the ether connector 11 on the right-hand side surface 3b of the main body portion 3. The VGA connector 10 includes a VGA connector lower surface 10a that is exposed from a bottom surface 8a of the bottom 8. A position of the VGA connector lower surface 10a and a position of the bottom surface 8a of the main body portion 3 in a thickness direction orthogonal to the bottom surface 8a (Z direction in FIG. 4) are substantially the same. The ether connector 11 includes a cover 11a that is rotatable with the bottom surface 8a side of the main body portion 3 as a fulcrum. Similarly, a position of a lower surface K of the cover 11a of the ether connector 11 and the position of the bottom surface 8a in the thickness direction (Z direction in FIG. 4) are substantially the same.

(Structure of Bottom Tilt Foot)

Figure 5:
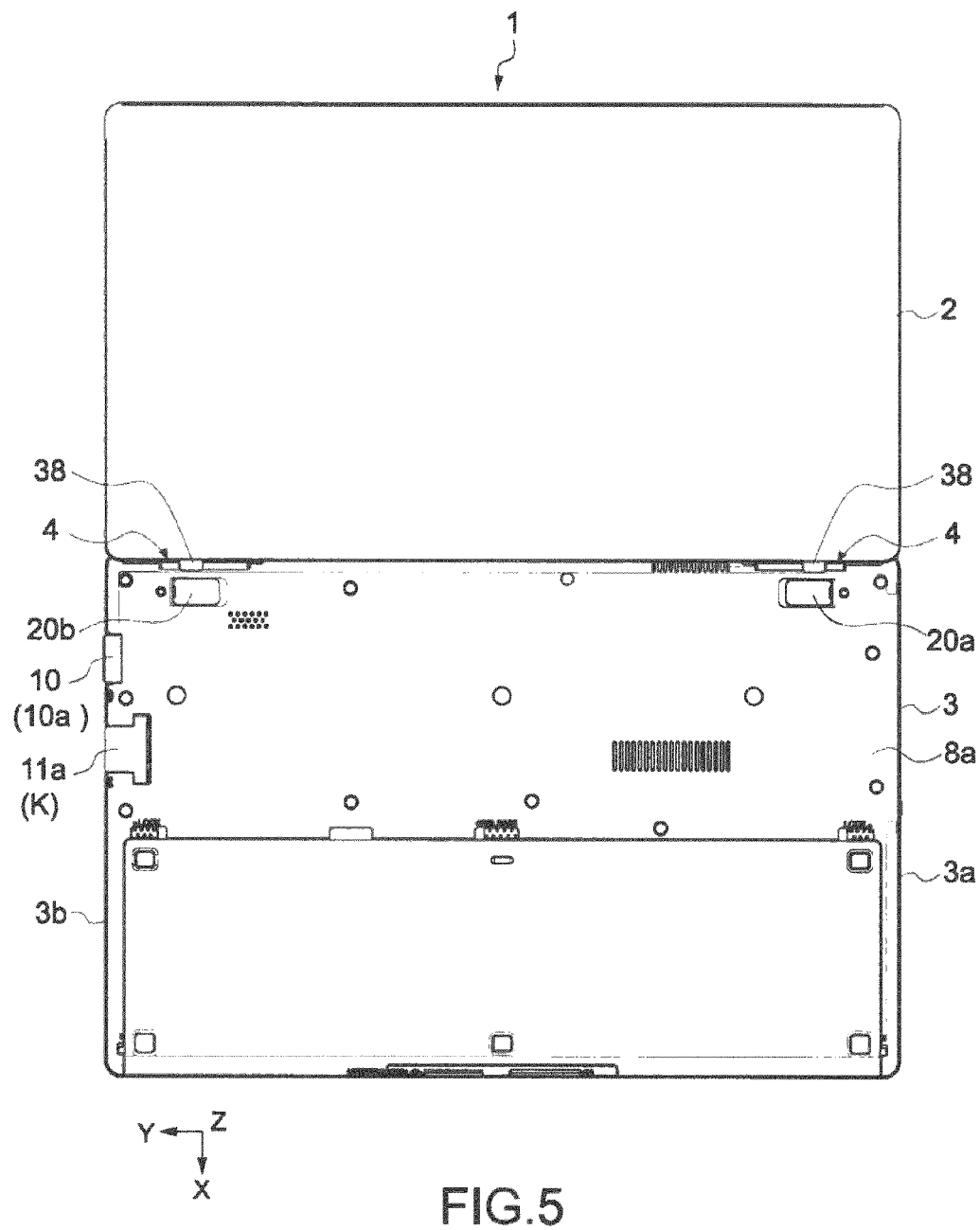
FIG. 5 is a bottom view of the electronic apparatus shown in FIG. 1.

FIG. 5 is a bottom view of the electronic apparatus 1 shown in FIG. 1.

On the bottom surface 8a of the main body portion 3, a pair of bottom tilt foots 20a and 20b are provided in the vicinity of the coupling portions 4. The bottom tilt foot 20a is provided on the left-hand side surface 3a side in a width direction (Y direction in FIG. 5), and the bottom tilt foot 20b is provided on the right-hand side surface 3b side in the width direction (Y direction in FIG. 5). The bottom tilt foots 20a and 20b are rotatable with respect to the bottom surface 8a of the main body portion 3. Tip end surfaces of the bottom tilt foots 20a and 20b are placed on a placement surface such as an upper surface of a desk in a state where the bottom tilt foots 20a and 20b protrude from the bottom surface 8a.

Figure 6:
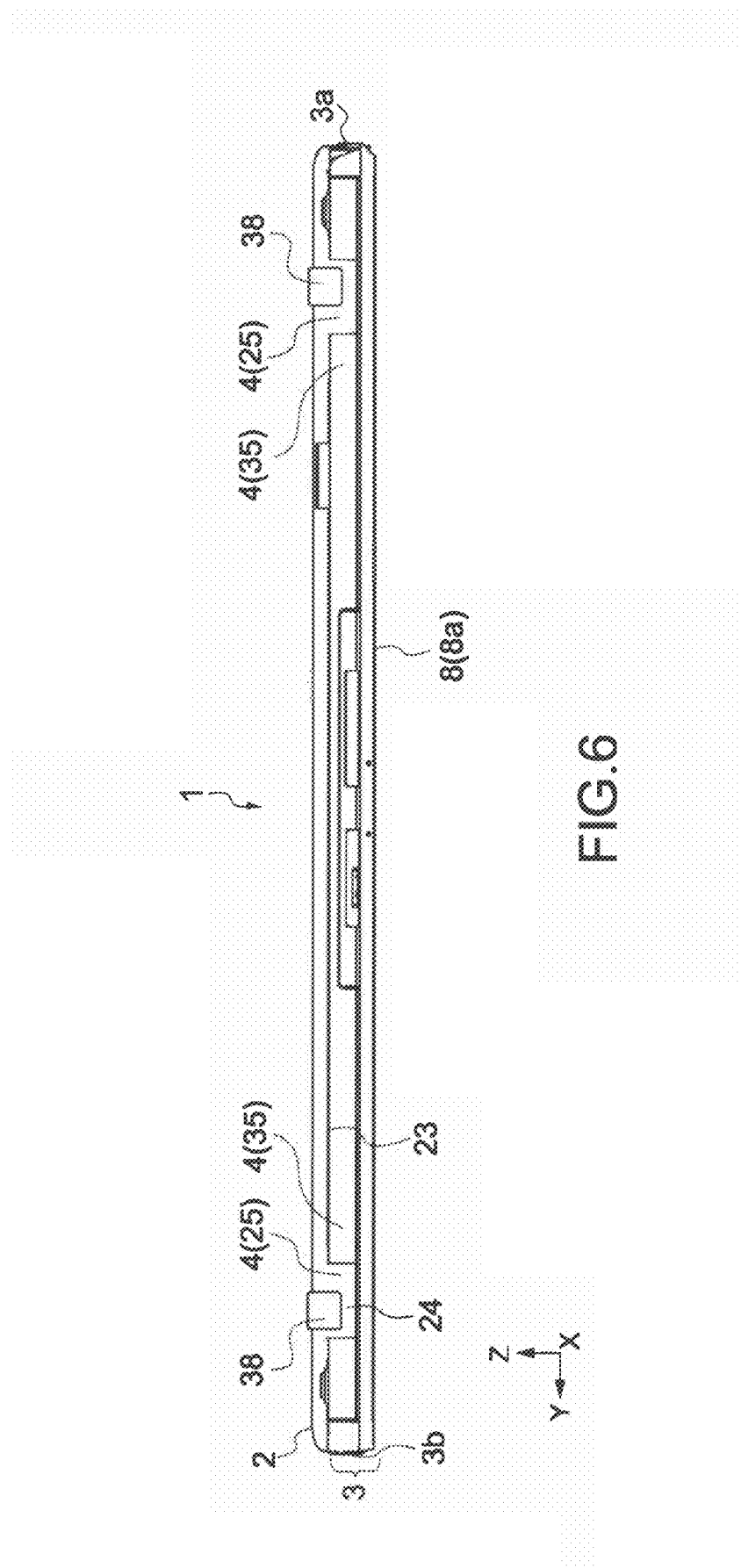
FIG. 6 is a back view of the electronic apparatus shown in FIG. 2.
Figure 7:
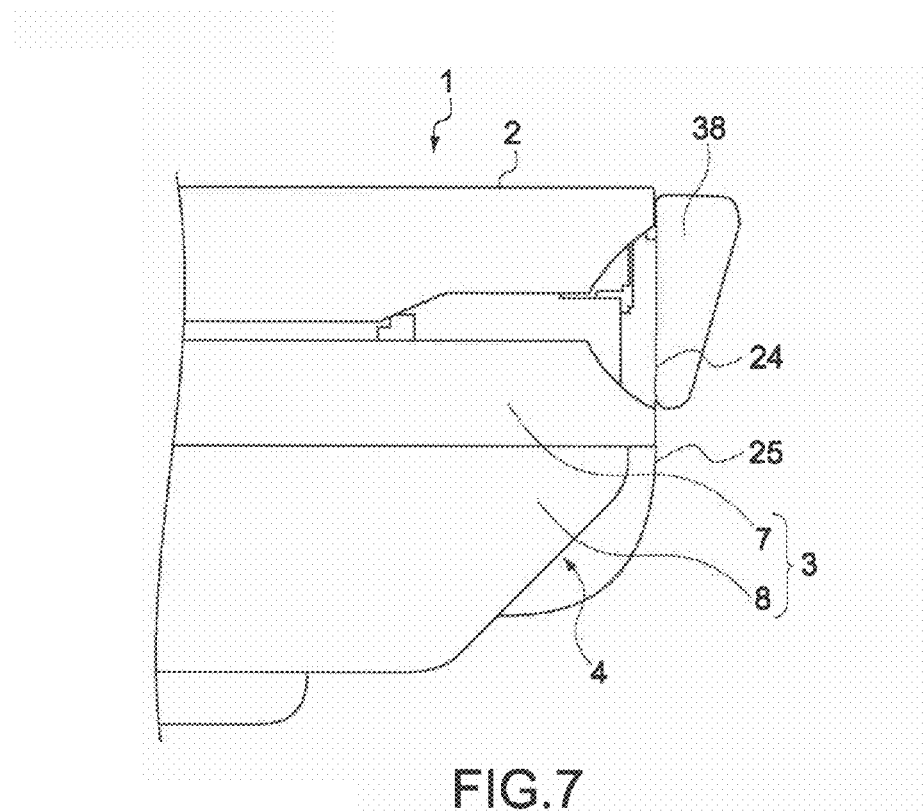
FIG. 7 is a side view showing a portion of the electronic apparatus in the vicinity of a coupling portion shown in FIG. 6.
Figure 8:
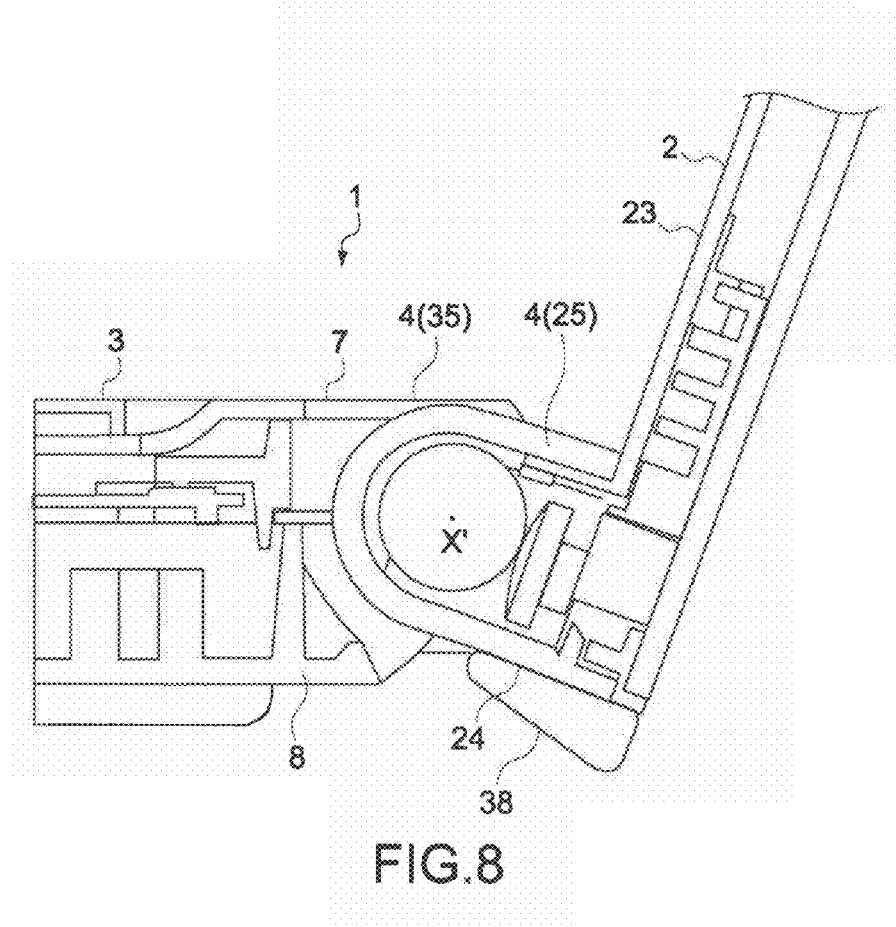
FIG. 8 is a cross-sectional diagram showing a structure of the electronic apparatus in the vicinity of the coupling portion shown in FIG. 1.

FIG. 6 is a back view of the electronic apparatus 1 shown in FIG. 2. FIG. 7 is a side view showing a portion of the electronic apparatus 1 in the vicinity of the coupling portion 4 shown in FIG. 2. FIG. 8 is a cross-sectional diagram showing a structure of the coupling portion 4 of the electronic apparatus 1 shown in FIG. 1.

The display portion 2 includes two coupling shaft portions 25 that constitute a part of the coupling portions 4 as shown in FIG. 6. The coupling shaft portions 25 each protrude from a surface 23 of the display portion 2 on a side opposed to the main body portion 3 in the thickness direction of the display portion 2 (Z direction in FIG. 6). While being rotatable about a rotary shaft X', the coupling shaft portions 25 are coupled with coupling shaft portions 35 that constitute a part of the coupling portions 4 using coupling hinges as shown in FIG. 8. Tilt cushions 38 are provided on a back surface 24 of the display portion 2 (back surface 24 of coupling shaft portions 25). The tilt cushions 38 are each substantially rectangular as shown in FIG. 6 and formed of a synthetic resin having elasticity.

Figure 9:
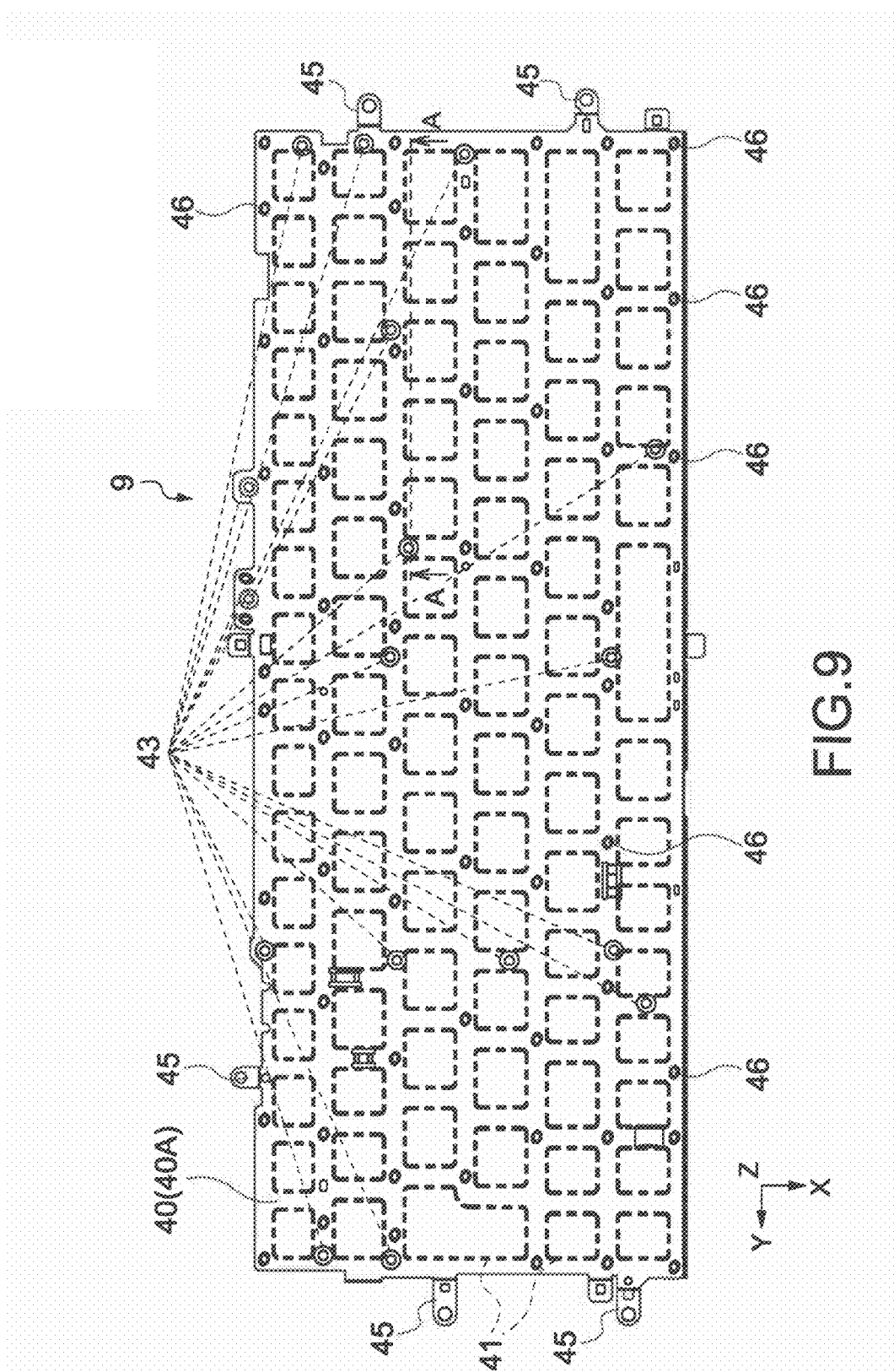
FIG. 9 is a bottom view of a keyboard unit incorporated in a main body portion.
Figure 10:
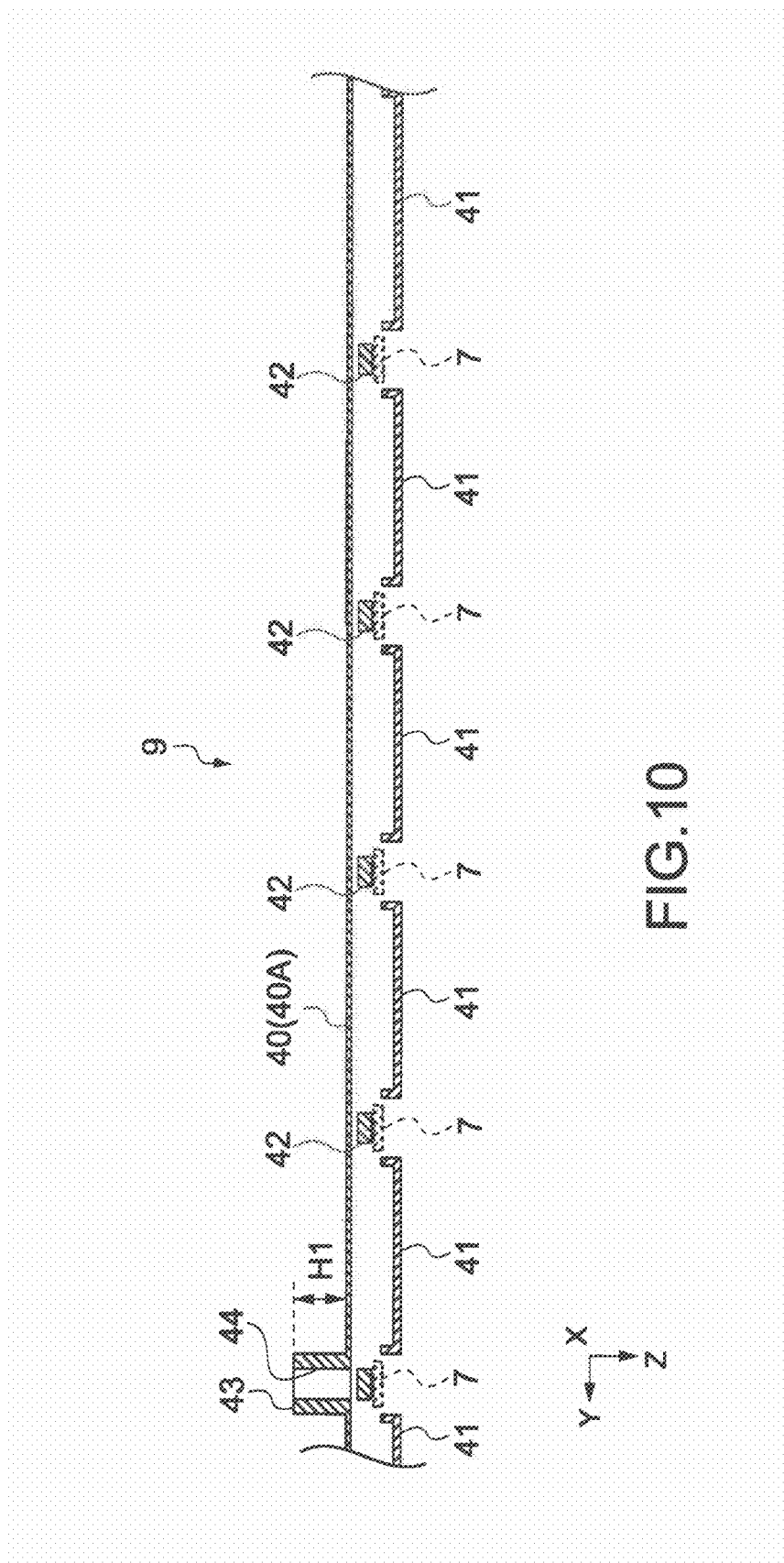
FIG. 10 is a cross-sectional diagram of the keyboard unit shown in FIG. 9 taken along the line A-A.

FIG. 9 is a bottom view of the keyboard unit 9 incorporated in the main body portion 3. FIG. 10 is a cross-sectional diagram of the keyboard unit 9 shown in FIG. 9 taken along the line A-A.

The keyboard unit 9 includes a plate 40 provided on a bottom surface side of the keyboard unit 9, a plurality of keys 41 provided on an upper surface side of the keyboard unit 9, and a frame 42 on which the palm rest 7 as an exterior component is mounted. The frame 42 is fixed to the plate 40 at a plurality of welding positions 46.

The plate 40 is a substantially-rectangular metal plate, and a plurality of bosses 43 as coupling portions protrude from a bottom surface 40A of the plate 40 in a direction orthogonal to the bottom surface 40A (Z direction in FIG. 10). The bosses 43 are also formed of metal. Aluminum is used as a constituent material of the plate 40, for example. The bosses 43 are provided dispersively across the entire bottom surface 40A. The bosses 43 are each provided in association with a space between the adjacent keys 41 or provided at edge portions of the bottom surface 40A. A height of each of the bosses 43 from the bottom surface 40A in the direction orthogonal to the bottom surface 40A (Z direction) is referred to as height H1 or H2 (<height H1) as will be described later. The heights H1 and H2 can be adjusted as appropriate. A screw hole portion 44 is formed on an inner circumferential surface side of each of the bosses 43. At an outer edge portion of the plate 40, a plurality of screwing portions 45 for screwing the keyboard unit 9 to the palm rest 7 are provided.

Figure 11:
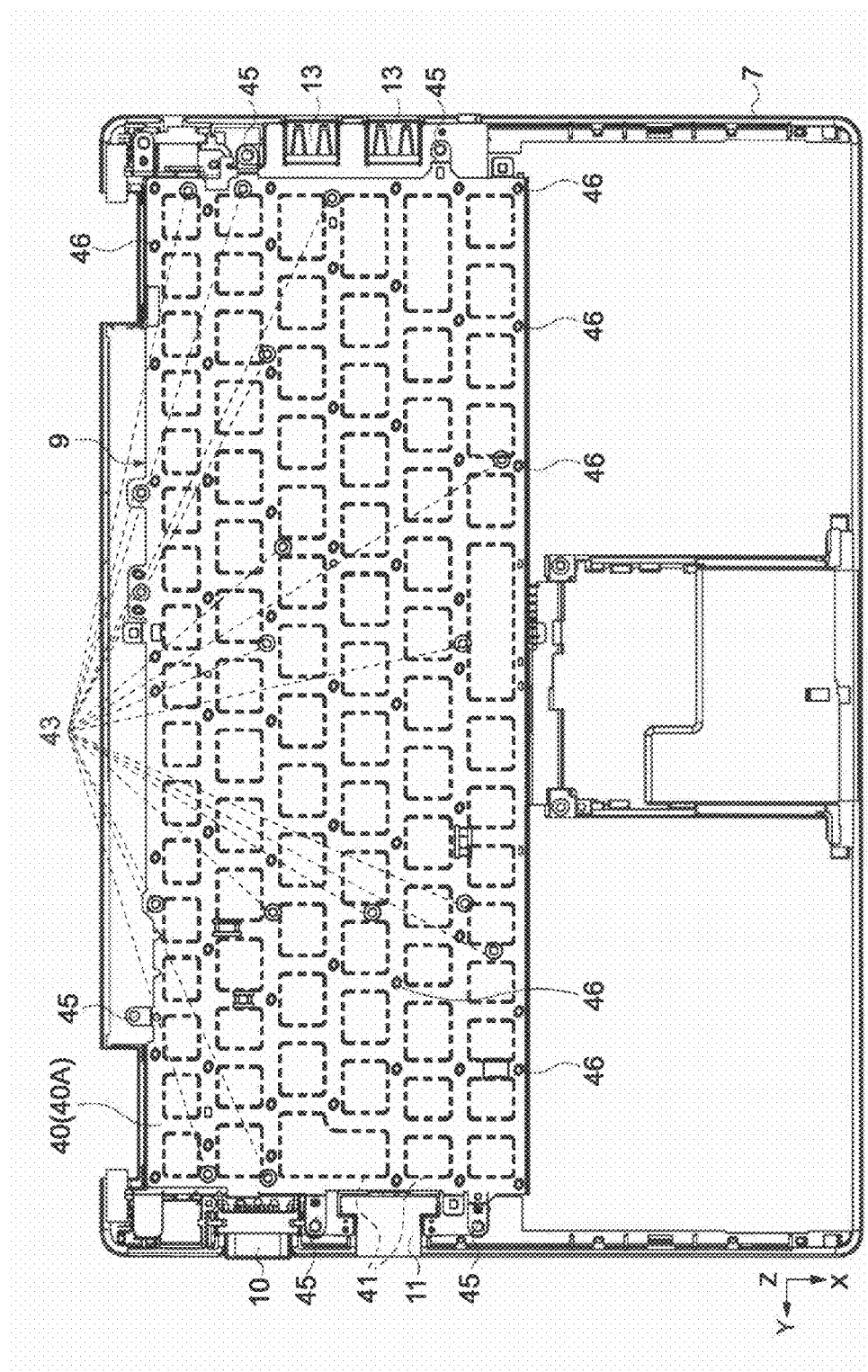
FIG. 11 is a bottom view showing a state where the keyboard unit shown in FIG. 9 is attached to a palm rest.

FIG. 11 is a bottom view showing a state where the keyboard unit 9 shown in FIG. 9 is attached to the palm rest 7.

As shown in the figure, on the back surface side of the palm rest 7 (rear side of X direction in FIG. 11), the keyboard unit 9 occupies about half the area of the palm rest 7 and is attached to the palm rest 7 using the screwing portions 45. At this time, the keyboard unit 9 is provided at a position (area) that is practically different from those of the VGA connector 10, the ether connector 11, and the plurality of connectors 13 within an XY plane and provided so that it practically does not overlap those components in the Z direction.

In this state, the plurality of bosses 43 of the plate 40 of the keyboard unit 9 protrude from the bottom surface 40A of the plate 40 in the Z direction orthogonal to the bottom surface 40A.

Figure 12:
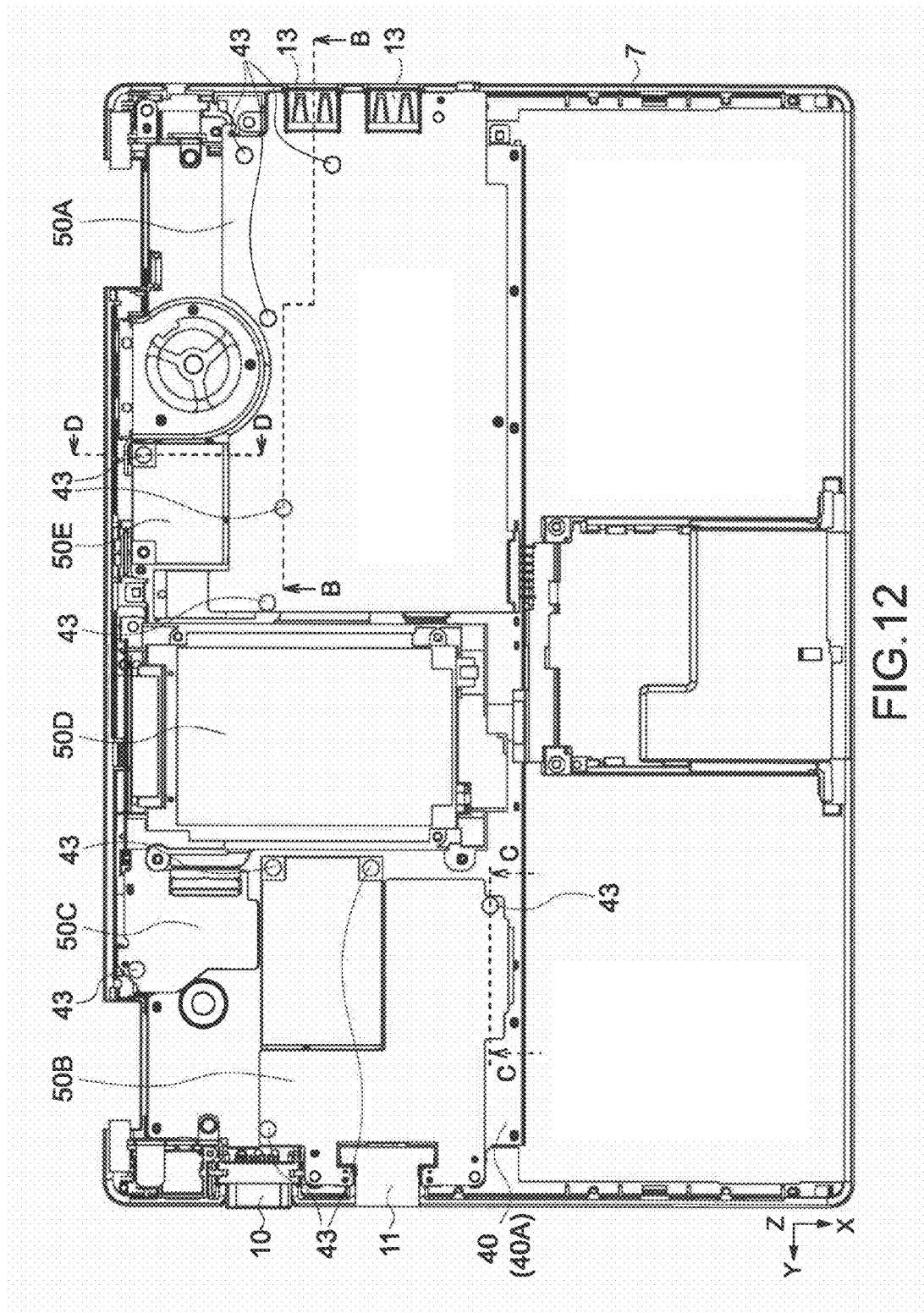
FIG. 12 is a bottom view showing a state where circuit boards are attached to the keyboard unit shown in FIG. 11.

FIG. 12 is a bottom view showing a state where circuit boards are assembled inside the keyboard unit 9 shown in FIG. 11.

A first circuit board 50A, a second circuit board 50B, a third circuit board 50C, and an SSD unit 50D are provided so as to come into contact with and face tip ends of the respective bosses 43 of the plate 40 of the keyboard unit 9 and screwed by the bosses 43. Moreover, a wireless communication module 50E as a packaging device is provided in contact with the tip end of the boss 43 and screwed by the boss 43.

The first circuit board 50A, the second circuit board 50B, the third circuit board 50C, the SSD unit 50D, the wireless communication module 50E, and the like are practically provided at different positions (areas) within the XY plane and provided so that they practically do not overlap one another in the Z direction. Further, the first circuit board 50A, the second circuit board 50B, the third circuit board 50C, the SSD unit 50D, the wireless communication module 50E, and the like are practically provided at positions (areas) different from those of the VGA connector 10, the ether connector 11, and the connectors 13 within the XY plane and provided so that they practically do not overlap those components in the Z direction.

Figure 13:
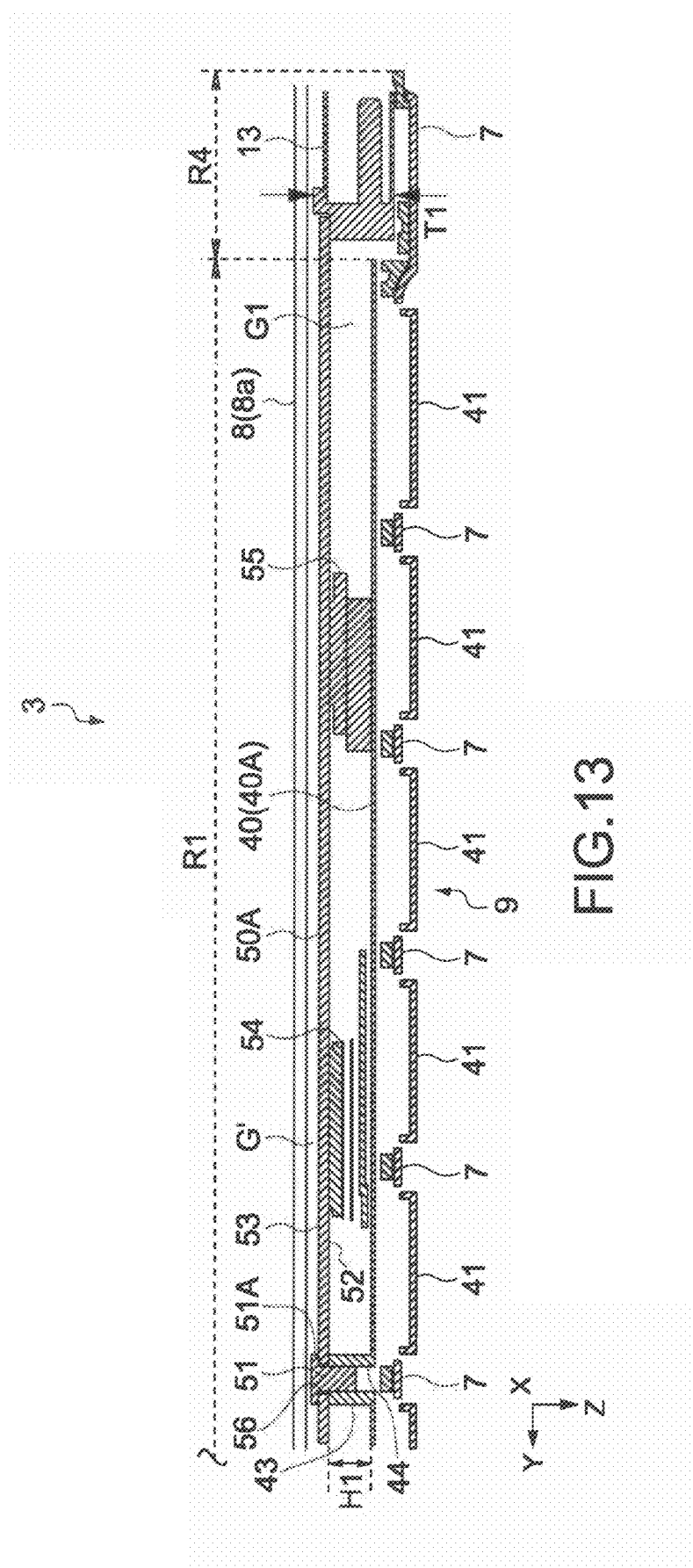
FIG. 13 is a cross-sectional diagram showing a portion on an upper surface side of the main body portion shown in FIG. 12 taken along the line B-B.

FIG. 13 is a cross-sectional diagram showing a portion on an upper surface side of the main body portion 3 shown in FIG. 12 taken along the line B-B. It should be noted that FIG. 13 is a cross-sectional diagram showing a state where the bottom 8 and the palm rest 7 are combined.

The first circuit board 50A includes a first front surface 52 on a side opposed to the plate 40, a first back surface 53 on the other side of the first front surface 52, and a screw hole portion 56 as a coupling portion to be coupled with the boss 43. The screw hole portion 56 functions as a coupling portion that couples and fixes the first circuit board 50A to the plate 40. An area R1 is an area of the bottom surface 40A that faces the first circuit board 50A.

Specifically, the boss 43 of the plate 40 and the screw hole portion 56 of the first circuit board 50A are aligned and a tip end of the boss 43 and the first front surface 52 of the first circuit board 50A are brought into contact with each other, to thus couple the first circuit board 50A with the boss 43 using a screw 51.

A length of the screw 51 (length in Z direction) is determined based on the length H1 of the boss 43. Accordingly, the length of the screw 51 to be inserted into the boss 43 can be elongated without thickening the main body portion 3 (effective insertion amount can be increased). As a result, a fixing intensity of the first circuit board 50A with respect to the plate 40 can be enhanced while realizing a reduction in thickness of the main body portion 3. Moreover, the first back surface 53 of the first circuit board 50A is provided in the vicinity of the bottom 8. A small gap G' is formed between the first back surface 53 of the first circuit board 50A and the bottom 8. A head portion 51A of the screw 51 is thin enough to be accommodated in the gap G'.

The first front surface 52 of the first circuit board 50A is substantially parallel to the bottom surface 40A of the plate 40 while being apart from the bottom surface 40A only by a distance corresponding to the length H1 of the boss 43 in a height direction. A gap G1 is formed between the first front surface 52 and the bottom surface 40A.

Electronic components 54 and 55 and the like are mounted on the first front surface 52 of the first circuit board 50A. No electronic component or the like is mounted on the first back surface 53 of the first circuit board 50A (one-side mounting). The electronic components 54 and 55 and the like are provided in the gap G1. The length H1 of the boss 43 is adjusted as appropriate based on a thickness of the electronic components 54 and 55 and the like. One of the electronic components 54 and 55 is a CPU (Central Processing Unit). The electronic components 54 and 55 each include a ground terminal (not shown). The ground terminals are electrically connected to the bosses 43 via a ground line (not shown) drawn to the first circuit board 50A.

The connectors 13 are provided in an area R4 as an area that is an area different from the area R1 in the XY plane and that does not overlap the area R1 in the Z direction. A thickness T1 of each of the connectors 13 is larger than the length H1 of the boss 43.

Figure 14:
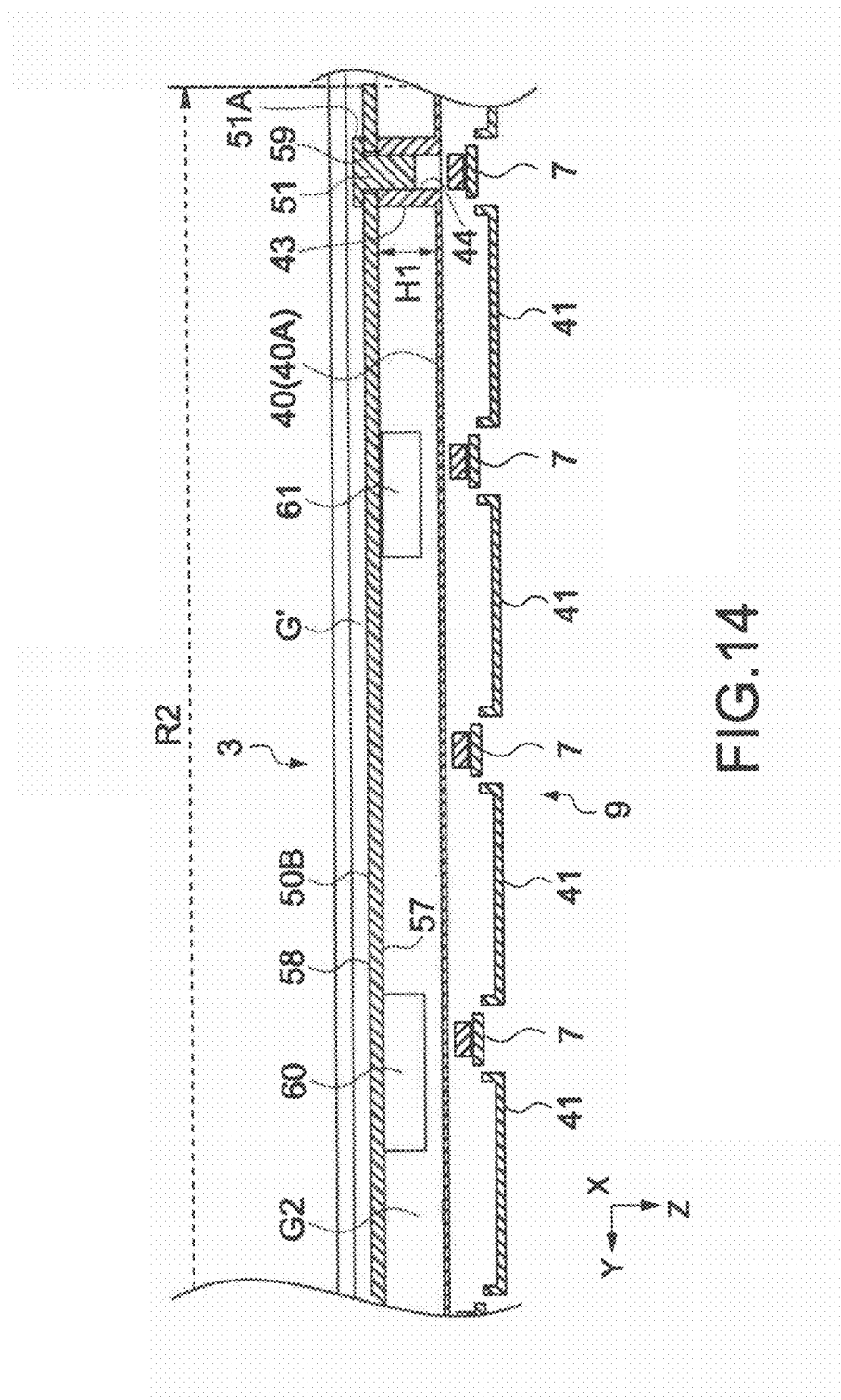
FIG. 14 is a cross-sectional diagram showing a portion on an upper surface side of the main body portion shown in FIG. 12 taken along the line C-C.

FIG. 14 is a cross-sectional diagram showing a portion on an upper surface side of the main body portion 3 shown in FIG. 12 taken along the line C-C. It should be noted that FIG. 14 is a cross-sectional diagram showing a state where the bottom 8 and the palm rest 7 are combined.

The second circuit board 50B includes a second front surface 57 on a side opposed to the plate 40, a second back surface 58 on the other side of the second front surface 57, and a screw hole portion 59 as a coupling portion to be coupled with the boss 43 using the screw 51. The screw hole portion 59 functions as a coupling portion that couples and fixes the second circuit board 50B to the plate 40. An area R2 is an area of the bottom surface 40A that is outside the area R1 and faces the second circuit board 50B.

Specifically, the screw hole portion 44 of the boss 43 and the screw hole portion 59 of the second circuit board 50B are aligned and the second front surface 57 of the second circuit board 50B is brought into contact with the tip end of the boss 43, to thus couple the second circuit board 50B with the boss 43 by the screw 51.

The length of the screw 51 (length in Z direction) is determined based on the length H1 of the boss 43. Accordingly, the length of the screw 51 to be inserted into the boss 43 can be elongated without thickening the main body portion 3. As a result, a fixing intensity of the second circuit board 50B with respect to the plate 40 can be enhanced while realizing a reduction in thickness of the main body portion 3. Moreover, the second back surface 58 of the second circuit board 50B is provided in the vicinity of the bottom 8. A small gap G' is formed between the second back surface 58 of the second circuit board 50B and the bottom 8. The head portion 51A of the screw 51 is thin enough to be accommodated in the gap G'.

The second front surface 57 of the second circuit board 50B is substantially parallel to the bottom surface 40A of the plate 40 while being apart from the bottom surface 40A only by a distance corresponding to the length H1 of the boss 43. A gap G2 is formed between the second front surface 57 and the bottom surface 40A.

Electronic components 60 and 61 and the like are mounted on the second front surface 57 of the second circuit board 50B. No electronic component or the like is mounted on the second back surface 58 of the second circuit board 50B (one-side mounting). The electronic components 60 and 61 and the like are provided in the gap G1. The length H1 of the boss 43 is adjusted as appropriate based on a thickness of the electronic components 60 and 61 and the like. The electronic components 60 and 61 execute processing for performing information communication via, for example, the VGA connector 10 and the ether connector 11. The electronic components 60 and 61 each include a ground terminal (not shown). The ground terminals are electrically connected to the bosses 43 via a ground line (not shown) drawn to the second circuit board 50B.

Figure 15:
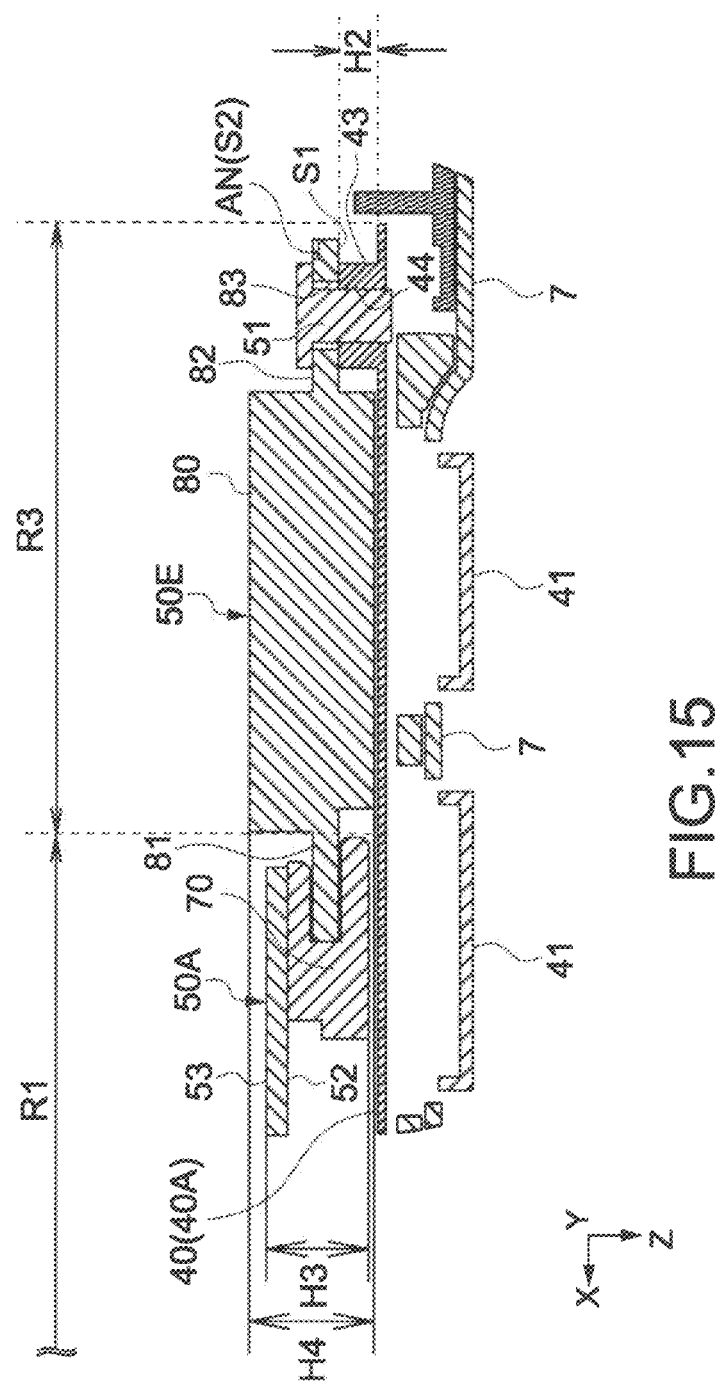
FIG. 15 is a cross-sectional diagram showing the portion on the upper surface side of the main body portion shown in FIG. 12 taken along the line D-D.

FIG. 15 is a cross-sectional diagram showing the portion on the upper surface side of the main body portion shown in FIG. 12 taken along the line D-D.

A wireless communication module connector 70 is mounted on the first front surface 52 of the first circuit board 50A. The wireless communication module 50E is connected to the wireless communication module connector 70. A height of the wireless communication module connector 70 from the first back surface 53 of the first circuit board 50A in the thickness direction (Z direction in FIG. 15) is referred to as height H3.

The wireless communication module 50E is a module for realizing an information transmission with an external apparatus by wireless communication. The wireless communication module 50E is provided in an area R3 of the bottom surface 40A in the vicinity of the area R1 as an area facing the first circuit board 50A. The area R3 is an area outside the areas R1 and R2. The wireless communication module 50E includes a wireless communication module body portion 80, a terminal portion 81 to be connected to the wireless communication module connector 70, and a coupling terminal portion 82 used for coupling the wireless communication module 50E with the plate 40.

The wireless communication module body portion 80 is structured such that a wireless LAN card as a thin mini-card can be inserted. A thickness of the wireless communication module body portion 80 is referred to as thickness H4. The height H3 is smaller than the thickness H4.

The terminal portion 81 is connected to the wireless communication module connector 70. A screw hole portion 83 as a coupling portion to which the screw 51 is to be screwed is formed on the coupling terminal portion 82. The coupling terminal portion 82 includes a surface S1 as a surface on a side thereof that comes into contact with the tip end of the boss 43 and a surface S2 as a surface on the other side of the surface S1. By aligning the screw hole portion 83 of the coupling terminal portion 82 and the screw hole portion 44 of the boss 43 and bringing the tip end of the boss 43 into contact with the surface S1 of the coupling terminal portion 82, the wireless communication module 50E is coupled with the boss 43 by the screw 51. The length H2 of the boss 43 shown in FIG. 15 in the height direction is smaller than the length H1 of the boss 43 described above. The screw 51 has a sufficient length to penetrate the screw hole portion 83 and the screw hole portion 44. Accordingly, a length of the screw 51 to be inserted into the boss 43 can be increased. As a result, a fixing intensity of the wireless communication module 50E with respect to the plate 40 can be enhanced.

An antenna connection terminal AN is provided on the surface S2 of the coupling terminal portion 82. An antenna N (see FIG. 1) provided inside the display portion 2 is connected to the antenna connection terminal AN via a cable (not shown). The cable (not shown) is drawn inside the display portion 2, the coupling portions 4, and the main body portion 3. It should be noted that a position of the incorporated antenna N is not limited as long as it is inside the display portion 2 and can be changed as appropriate.

(Operation Etc.)

As described above, according to this embodiment, the plate 40 of the keyboard unit 9 includes the plurality of bosses 43 protruding from the bottom surface 40A thereof. The first circuit board 50A and the like are provided in contact with the tip ends of the plurality of bosses 43, and the bosses 43 and the first circuit board 50A are coupled by the screws 51. In other words, since the first circuit board 50A can be coupled with the bosses 43 of the plate 40 of the keyboard unit 9, a metal frame for fixing the first circuit board 50A as in the related art does not need to be provided in addition to the keyboard unit 9, with the result that the electronic apparatus 1 can be made thin. Moreover, since a metal frame does not need to be used in addition to the keyboard unit 9, a weight and the number of components of the electronic apparatus 1 can be reduced.

At this time, the first circuit board 50A can be provided apart from the bottom surface 40A of the plate 40 of the keyboard unit 9 only by a distance corresponding to the length H1 of the bosses 43. Therefore, the electronic components 54 and 55 mounted on the first circuit board 50A are provided between the first front surface 52 of the first circuit board 50A and the bottom surface 40A of the plate 40. As a result, the electronic apparatus 1 can be made thin.

Further, as shown in FIG. 12, the first circuit board 50A, the second circuit board 50B, the third circuit board 50C, the SSD unit 50D, the wireless communication module 50E, and the like are practically arranged at different positions within the XY plane so as not to practically overlap one another in the Z direction. Therefore, the electronic apparatus 1 can be made thinner than in a case where the first circuit board 50A and the SSD unit 50D overlap in the thickness direction (Z direction in FIG. 12), for example. Moreover, since the first circuit board 50A, the second circuit board 50B, the third circuit board 50C, the SSD unit 50D, the wireless communication module 50E, and the like can be attached independently, that is, a degree of freedom in attaching the circuit boards and the like increases, workability in an attachment task, a replacement task, and the like can be improved.

Further, the first circuit board 50A, the second circuit board 50B, the third circuit board 50C, the SSD unit 50D, the wireless communication module 50E, and the like are practically arranged at positions different from those of the VGA connector 10, the ether connector 11, and the connectors 13 within the XY plane so as not to practically overlap those components in the Z direction. Therefore, it is possible to prevent the electronic apparatus 1 from becoming thick.

Furthermore, since the electronic components 60 and 61 mounted on the second front surface 57 of the second circuit board 50B are provided between the bottom surface 40A of the plate 40 of the keyboard unit 9 and the second front surface 57 as shown in FIG. 14, the electronic apparatus 1 can be made thin.

Moreover, the plate 40 of the keyboard unit 9 includes the boss 43 protruding from the area R3 as shown in FIG. 15. The coupling terminal portion 82 of the wireless communication module 50E is coupled with the boss 43 by the screw 51. Thus, when a wireless communication module is mounted on the first front surface 52 of the first circuit board 50A, a thickness of the wireless communication module 50E is minimally required in addition to the thickness of the first circuit board 50A. On the other hand, in this embodiment, it is possible to prevent the first circuit board 50A and the wireless communication module 50E from overlapping each other in the Z direction and thus make the electronic apparatus 1 thin.

Further, the height H3 of the wireless communication module connector 70 from the first back surface 53 of the first circuit board 50A in the thickness direction (Z direction in FIG. 15) is smaller than the thickness H4 of the wireless communication module body portion 80. In other words, it is possible to attach the first circuit board 50A in the area R1 shown in FIG. 15 and set the height thereof from the bottom surface 40A necessary at the time of attaching the wireless communication module 50E in the area R3 to be equal to or smaller than the thickness H4 of the wireless communication module 50E.

Moreover, since the wireless communication module 50E can be attached to the keyboard unit 9 apart from an attachment task of the second circuit board 50B and the like with respect to the keyboard unit 9, workability in, for example, attaching and replacing the wireless communication module 50E can be improved. For example, the wireless communication module 50E can be attached last to the plate 40 after the second circuit board 50B and the like are attached to the plate 40 of the keyboard unit 9. Therefore, productivity of electronic apparatuses of various specifications can be improved.

Furthermore, the antenna connection terminal AN to which an antenna can be connected is provided on the surface S2 of the coupling terminal portion 82 as shown in FIG. 15. In other words, since the surface S2 of the coupling terminal portion 82 is exposed on a side that faces an operator, the antenna can be easily attached to and detached from the antenna connection terminal AN on the surface S2. Thus, workability in attaching and replacing the antenna with respect to the antenna connection terminal AN can be improved. Further, since the surface S2 on which the antenna connection terminal AN is provided faces the circuit boards due to the arrangement of the connectors on the circuit boards in the related art, it has been necessary to attach the circuit boards to a wireless module after connecting an antenna to a terminal. Thus, once the antenna is attached, it has been difficult to change the wireless module in a CTO (Configure To Order) model. Even in such a case, in this embodiment, the antenna and the wireless module can be detached easily and replaced.

Further, the ground terminals (not shown) of the electronic components 54 and 55 are electrically connected to the bosses 43 via a ground line (not shown) drawn to the first circuit board 50A. In addition, the ground terminals (not shown) of the electronic components 60 and 61 are electrically connected to the bosses 43 via a ground line (not shown) drawn to the second circuit board 50B. With this structure, the plate 40 of the keyboard unit 9 that is formed of metal can be used as a ground of the electronic components 54, 55, 60, and 61.

Moreover, when mounting the electronic components on the first back surface 53 of the first circuit board 50A, it is necessary to set the height of the bosses to be smaller than the length H1. On the other hand, since the electronic components 54 and 55 are mounted on one surface of the first circuit board 50A in this embodiment, the length H1 of the bosses 43 can be increased. With this structure, the length of the screw 51 to be inserted into the boss 43 can be elongated without thickening the main body portion 3 (effective insertion amount can be increased). As a result, the first circuit board 50A can be more-positively coupled with the plate 40 of the keyboard unit 9.

Furthermore, by removing the bottom 8 of the main body portion 3, various circuit boards such as the first circuit board 50A, the second circuit board 50B, the third circuit board 50C, the SSD unit 50D, and the wireless communication module 50E become exposed as shown in FIG. 12. Therefore, an attachment task and a replacement task of the circuit boards and the like can be performed efficiently.

The present application contains subject matter related to that disclosed in Japanese Priority Patent Application JP 2009-197976 filed in the Japan Patent Office on Aug. 28, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
a keyboard unit including a plate that includes a front surface and a bottom surface facing each other and a first coupling portion protruding from the bottom surface, and a plurality of keys provided on the front surface side of the plate;
a first circuit board that is provided to face the bottom surface via the first coupling portion and includes a second coupling portion to be coupled with the first coupling portion and a first front surface as a surface on a side that faces the bottom surface; and
a first electronic component mounted on the first front surface of the first circuit board,
wherein the first coupling portion protrudes substantially perpendicularly from the bottom surface of the plate in a direction of the first circuit board.

2. The electronic apparatus according to claim 1,
wherein the bottom surface of the plate includes a first area corresponding to an area facing the first circuit board and a second area corresponding to an area outside the area facing the first circuit board, and
wherein the plate includes a third coupling portion protruding from the bottom surface in the second area,
the electronic apparatus further comprising:
a second circuit board that is provided to face the second area via the third coupling portion and includes a fourth coupling portion to be coupled with the third coupling portion and a second front surface as a surface on a side that faces the second area; and
a second electronic component mounted on the second front surface of the second circuit board.

3. The electronic apparatus according to claim 2,
wherein the bottom surface includes a third area that is an area outside the first area and the second area, the third area being provided in the vicinity of the first area, and
wherein the plate includes a fifth coupling portion protruding from the third area,
the electronic apparatus further comprising
a packaging device that includes a sixth coupling portion to be coupled with the fifth coupling portion and is provided in the third area.

4. The electronic apparatus according to claim 3,
wherein the packaging device includes a coupling end portion in which the sixth coupling portion is provided, and
wherein the coupling end portion includes a third surface facing the fifth coupling portion, a fourth surface as a surface on the other side of the third surface, and an external connection terminal that is provided on the fourth surface and is connectable with an external apparatus.

5. The electronic apparatus according to claim 4,
wherein the plate and the first coupling portion are each formed of metal, and
wherein the first coupling portion is electrically connected to a ground line of the first circuit board.

6. The electronic apparatus according to claim 5,
wherein the first electronic component is mounted only on the first front surface out of the first front surface and a first back surface of the first circuit board.

* * * * *